United States Patent [19]

Diemand

[11] Patent Number: 5,345,625
[45] Date of Patent: Sep. 13, 1994

[54] BATH/SHOWER WATER RECYCLING SYSTEM

[76] Inventor: Jeffrey P. Diemand, 1630 S. Michigan Ave., Chicago, Ill. 60616

[21] Appl. No.: 86,193

[22] Filed: Jul. 1, 1993

Related U.S. Application Data

[63] Continuation of Ser. No. 877,090, May 1, 1992, abandoned.

[51] Int. Cl.⁵ .............................................. A47K 4/00
[52] U.S. Cl. .................................................... 4/665
[58] Field of Search .................................. 4/665, 603

[56] References Cited

U.S. PATENT DOCUMENTS

| | | | |
|---|---|---|---|
| 2,308,452 | 1/1943 | Orytl | 4/603 |
| 3,112,497 | 12/1963 | Call | 4/665 X |
| 3,188,656 | 6/1965 | Drager | 4/665 X |
| 3,543,294 | 11/1970 | Boester | 4/665 X |
| 3,606,618 | 9/1971 | Veech | 4/603 |
| 4,162,218 | 7/1979 | McCormick | 4/665 X |
| 4,197,597 | 4/1980 | Toms | 4/300 |
| 4,224,700 | 9/1980 | Bloys | 4/603 |
| 5,106,493 | 4/1992 | McIntosh | 4/665 X |

FOREIGN PATENT DOCUMENTS

| | | | |
|---|---|---|---|
| 0427213 | 5/1991 | European Pat. Off. | 4/665 |
| 2336744 | 7/1973 | Fed. Rep. of Germany . | |
| 3434-267-A | 9/1984 | Fed. Rep. of Germany . | |
| 3722-240A1 | 7/1987 | Fed. Rep. of Germany . | |
| 3828-528A1 | 8/1988 | Fed. Rep. of Germany . | |
| 1262733 | 4/1960 | France . | |
| 2451973 | 3/1979 | France . | |
| 2-300-427 | 12/1990 | Japan . | |
| 0300427 | 12/1990 | Japan | 4/665 |
| 0122326 | 5/1991 | Japan | 4/665 |

*Primary Examiner*—Charles E. Phillips
*Attorney, Agent, or Firm*—Leydig, Voit & Mayer Ltd.

[57] ABSTRACT

A waste water recovery system for recycling shower/bath water for use in a tank-type toilet is provided. The system includes a storage tank with a suction pump to draw water into the storage tank. The system also includes a valve which is used to timely shut off the pump when the tank is full. Recovered water from the storage tank is delivered to the toilet tank when needed. A collector which surrounds the floor drain is removably attachable either by adhesive or suction means to the floor of a bath or shower and has an inlet and an outlet. Waste water is drawn by a suction pump from the outlet of a collector to the storage tank.

10 Claims, 5 Drawing Sheets

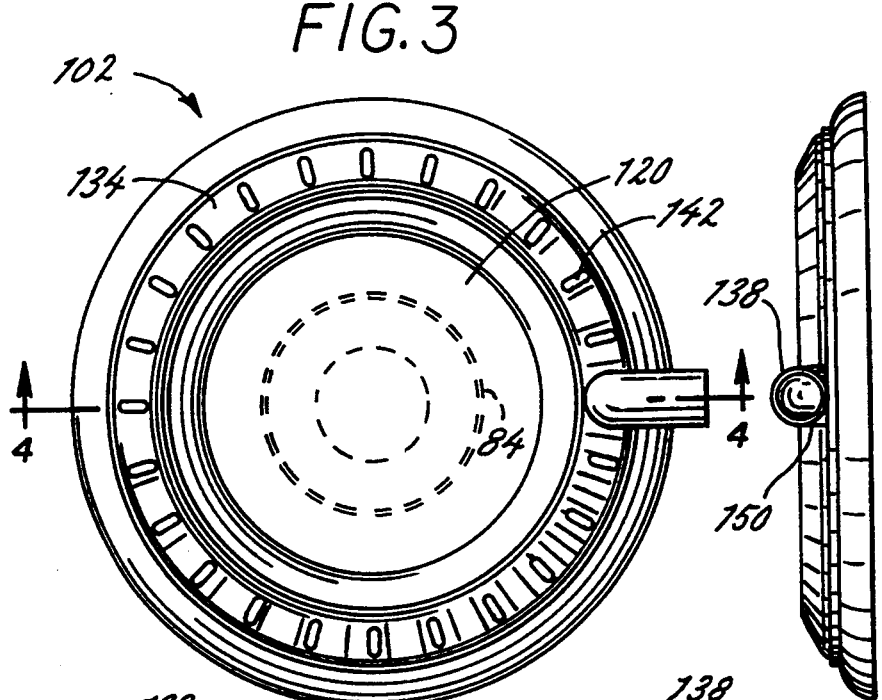
FIG. 3
FIG. 5
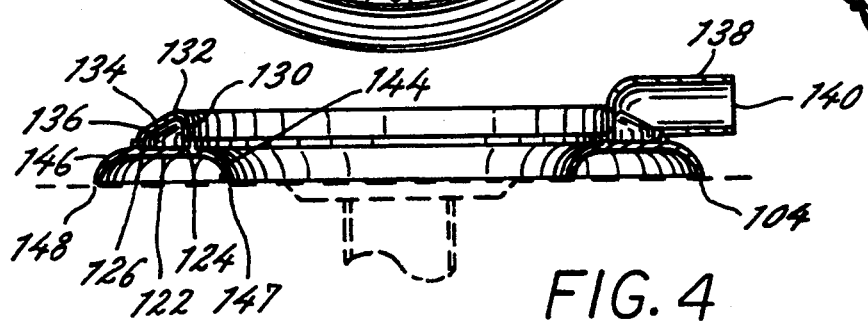
FIG. 4
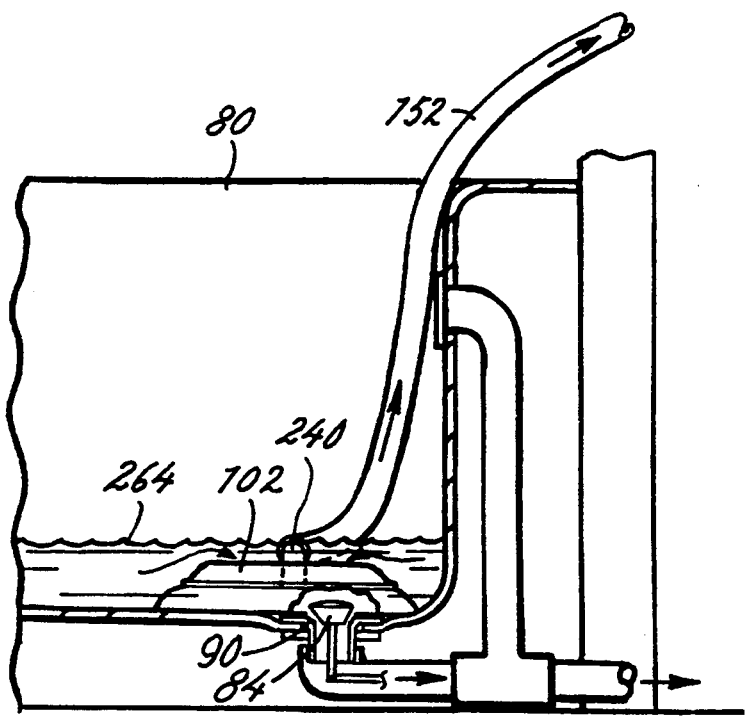
FIG. 2

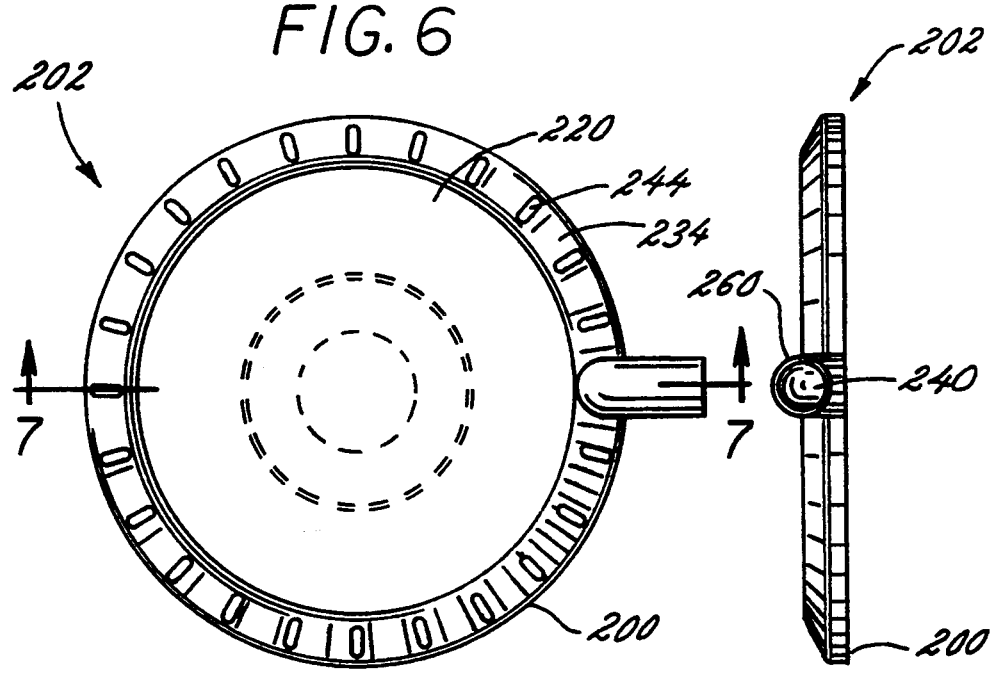
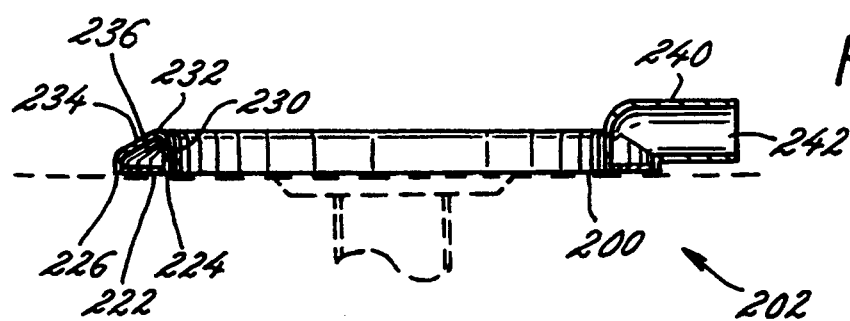

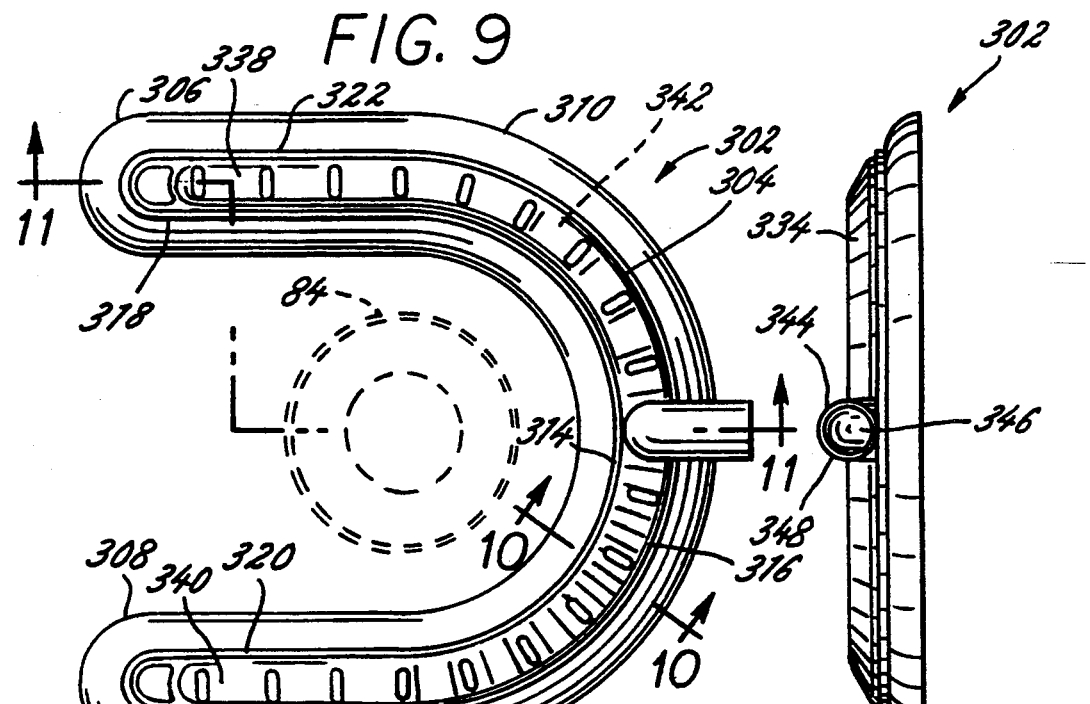
FIG. 9
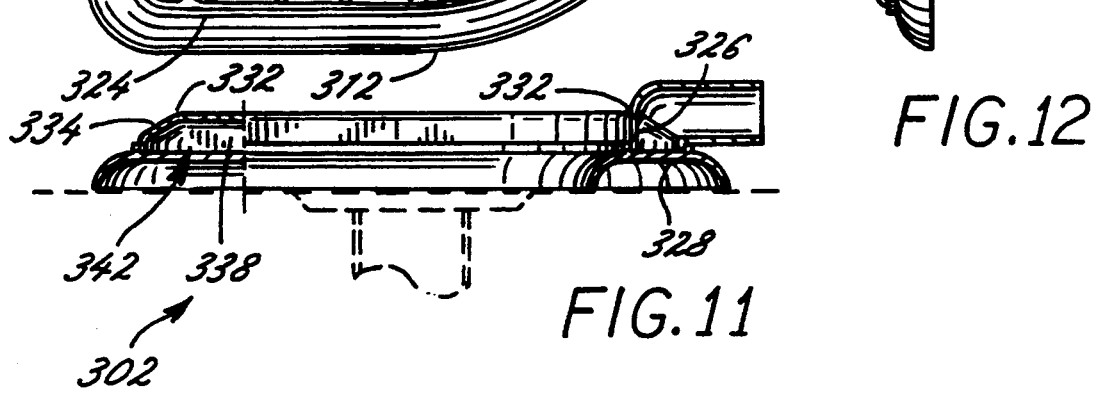
FIG. 11
FIG. 12
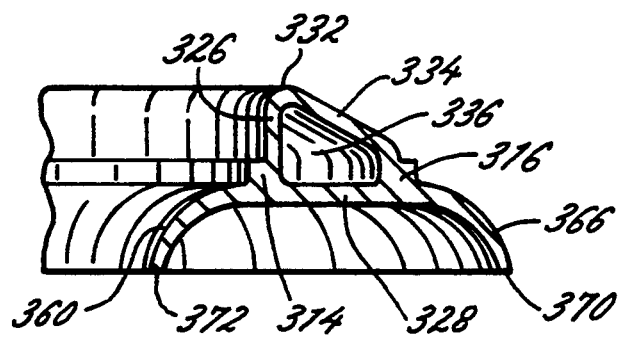
FIG. 10

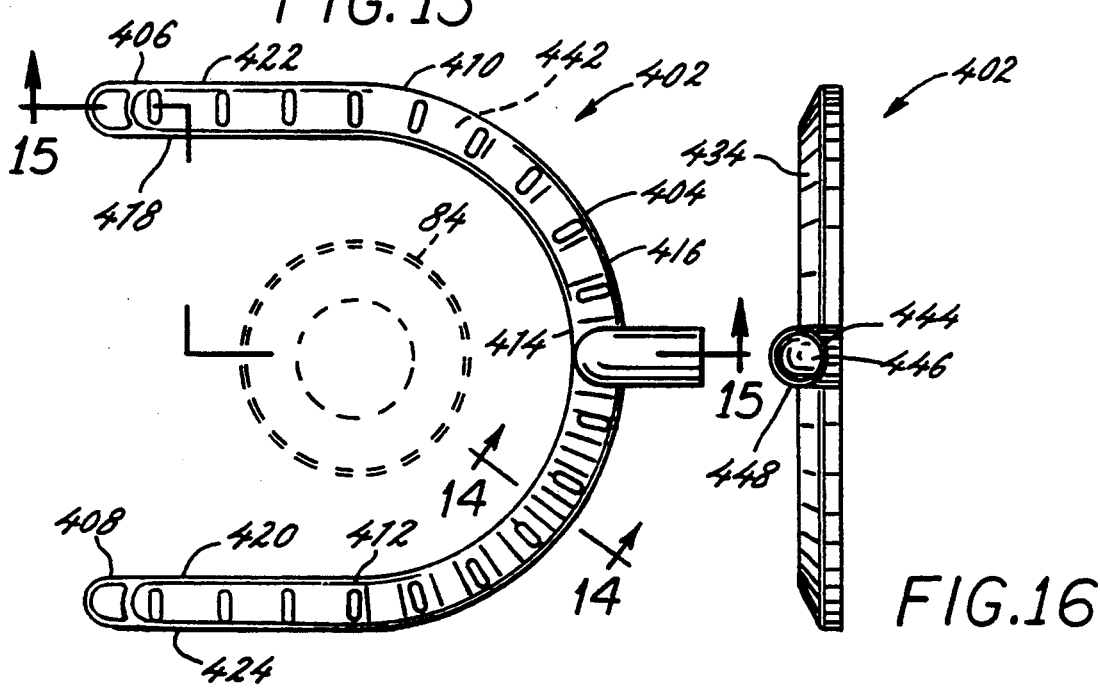
FIG. 13
FIG. 16
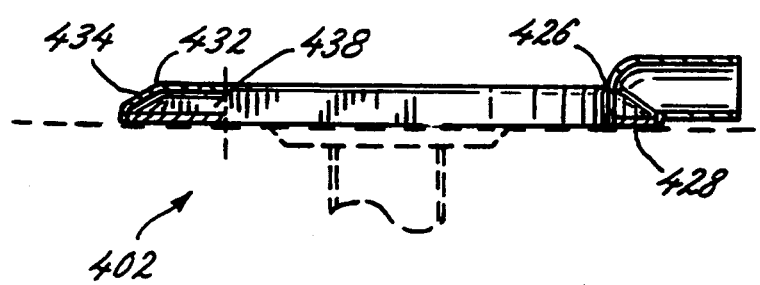
FIG. 15
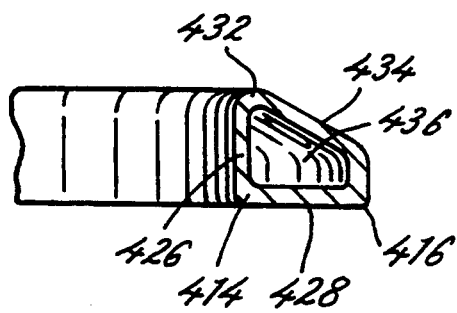
FIG. 14

BATH/SHOWER WATER RECYCLING SYSTEM

This is a continuation of copending application(s) Ser. No. 877,090 filed on May 1, 1990 now abandoned.

FIELD OF THE INVENTION

Technical Field

The present invention is directed toward water recycling systems and more particularly toward water recycling systems for use in residential bathrooms.

BACKGROUND OF THE INVENTION

Background Art

Residential water recycling systems are old in the art and generally involve the reuse of wash water to be used to flush toilets.

U.S. Pat. Nos. 3,112,467 to Call and 4,162,218 to McCormick both disclose water reuse systems for recovering and collecting used shower, sink and bath water. The water is collected at the drain pipes of the shower, bath or sink and transferred to a storage tank where it is later used to flush a commode.

West German patent No. 2,336,744 to Reinke and West German patent No. 3,828,528 to Hasse disclose a water recovery system for recovering used bath or shower water for use when flushing a toilet. The system has a collection device plumbed in the drain pipe of the tub and transfers water by means of a suction pump to a storage tank and then upon demand to a commode.

The above water recovery systems represent central water recovery systems for the entire home that requires a large capital expense to install. And since access to existing plumbing fittings that are under existing fixtures and/or behind existing walls, the retrofitting of a water recovery system into an existing home is very difficult and at least requires the removal of a tub and/or the shower stall. The large number of components and the central system nature of the many of these systems makes them expensive to install and maintain.

The present invention is directed to overcoming one or more of the problems discussed above.

SUMMARY OF THE INVENTION

In one aspect of the present invention a waste water recovery system for recycling shower/bath water for use with a tank-type toilet is provided. The system includes a storage tank with a suction pump to draw water into the storage tank. The system also includes a first float valve which is used to allow the tank to be filled and when the tank is filled to a desired level to preclude overflow. Recovered water from the storage tank is delivered to the toilet tank when needed by gravity. A collector is attached to the floor of a bath or shower which has a floor drain. The collector surrounds the floor drain and has an inlet and an outlet. The waste water enters at the inlet and is expelled at the outlet where it is drawn by the suction pump to the storage tank.

In a preferred embodiment of this aspect of the invention the collector is removably attachable by suction means to the floor of the bath or shower.

In another preferred embodiment of this aspect of the invention the storage tank has a reserve supply source to make up water when insufficient water is collected from the shower or tub. In another aspect of the invention a method of recycling shower/bath water is provided. The method consists of drawing used shower/bath water through a collector attached to the upper section of the floor of a shower or bath which has a floor drain. The next step is drawing water from the collector using a pump to the storage tank. The third step is directing the water from the storage tank to the tank of the tank operated toilet. In a preferred embodiment of this aspect of the invention a fourth step is provided which is the stopping of supply to the tank when the storage tank is full.

BRIEF DESCRIPTION OF THE DRAWINGS

FIG. 2 is a plan view of the bathing area of the present invention showing the use of the invention with a shower;

FIG. 3 is a top view of a first embodiment of the collector of the present invention;

FIG. 4 is a cross-sectional view taken along line 4—4 of FIG. 3;

FIG. 5 is an end view of a first embodiment of the collector of the present invention;

FIG. 6 is a top view of a second embodiment of the collector of the present invention;

FIG. 7 is a cross-sectional view taken along line 7—7 of FIG. 6;

FIG. 8 is an end view of a second embodiment of the collector of the present invention;

FIG. 9 is a top view of a third embodiment of the collector of the present invention;

FIG. 10 is a cross-sectional view taken along line 10—10 of FIG. 9;

FIG. 11 is a cross-sectional view taken along line 11—11 of FIG. 9;

FIG. 12 is an end view of the third embodiment of the collector of the present invention;

FIG. 13 is a top view of a fourth embodiment of the collector of the present invention;

FIG. 14 is a cross-sectional view taken along the line 14—14 of FIG. 13;

FIG. 15 is a cross-sectional view taken along line 15—15 of FIG. 13; and

FIG. 16 is an end view of the fourth embodiment of the collector of the present invention.

DESCRIPTION OF THE PREFERRED EMBODIMENT

Figure 1:
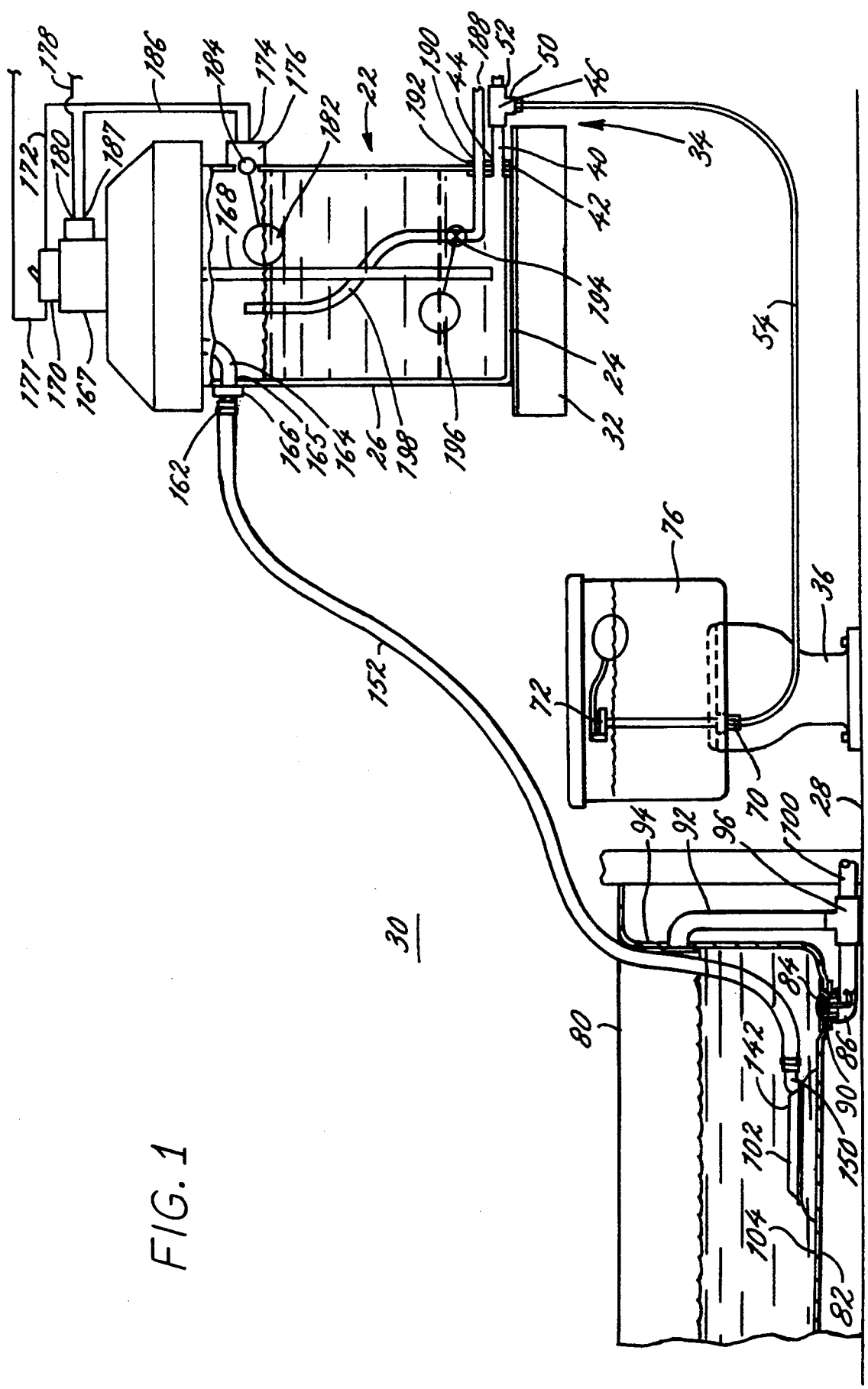
FIG. 1 is a plan view of a preferred embodiment of the present invention when used in connection with a bath tub.

An exemplary embodiment of a recovery system for recycling waste water 20 is shown generally in FIG. 1.

The recovery system 20 includes a storage tank means 22 which may be embodied in any type of water holding container e.g., a tank having a bottom 24 and upstanding sidewalls 26 forming a tank which will hold water. The tank 22 may be supported in an elevated position relative to a floor 28 of a bathroom 30 by resting the bottom 24 of the tank 20 on a shelf 32 or by any other suitable means. A supply means 34, for instance commercially available pipes and fittings made from metal or plastic, are connected between the tank 22 and a tank-type toilet 36.

The supply means 34 for example may include a first pipe 40 extending through a first opening 42 in the side wall 26 near the bottom 24 of the storage tank 22. The first pipe 40 is secured to the side wall 26 by means of a weld 44 or other suitable means to secure and seal the first pipe 40. Attached to the first pipe 40 is a first fitting 46. The first fitting 46 may either be an elbow or a "T". The first fitting 46 has a first outlet 50 and second outlet 52. The second outlet 52 is used to direct the gray water to a second tank-type toilet (not shown). The first outlet 50 is attached to a copper tubing 54, which is attached to a toilet reservoir fitting 70, which may be the standard inlet fitting 70 for the tank-type toilet 36. It should be noted that the supply means 34 may be fluidly connected to the tank-type toilet 36 at any location upstream from a toilet valve 72 which is located within a toilet reservoir 76.

In the practice of this invention a standard bathtub 80 has a floor 82 to which a floor drain 84 is attached. A drain pipe 86 is attached to the floor drain 84. The floor drain 84 also has a stopper or plug 90 in order that water may be allowed to accumulate in the tub 80. An overflow pipe 92 is attached to a side wall 94 of the bathtub 80. The overflow pipe 92 and the drain pipe 86 are connected to a T connector 96. The T connector 96 is further connected to drain lines of the household plumbing 100. A collector means or collector 102 is located on a top 104 of the floor 82 of the bathtub 80.

Referring to FIG. 2, the stopper or plug 90 is opened or removed in order that water may be expelled through the floor drain 84.

Referring to FIG. 3, the collector 102 has a general ring shape with a center opening 120 which is larger than the floor drain 84.

Referring to FIG. 4, the collector 102 has a bottom wall 122 with an inside diameter 124 and an outside diameter 126. An upstanding cylindrical vertical wall 130 extends upwardly from the inside diameter 124 of the bottom wall 122 of the collector 102 to an upper edge 132 of the vertical wall 130. A tapered cylindrical wall 134 extends from the outside diameter 126 of the bottom wall 122 of the collector 102 to the upper edge 132 of the vertical wall 130 of the collector 102, thereby forming a conduit 136 within the collector 102. An outlet means 138 is connected to the tapered cylindrical wall 134 of the collector 102 and has an opening 140 which is in fluid connection with the conduit 136.

Again referring to FIG. 3, a series of inlet means or elongated slots 142 are located in the tapered wall 134 of the collector 102. The slots 142 are preferably radially elongated and equally spaced around the collector.

Again referring to FIG. 4, a resilient inner lip 144 extends radially inward from the inside diameter 124 of the bottom wall 122 of the collector 102. An outer lip 146 extends radially outwardly from the outside diameter 126 of the bottom wall 122 of the collector 102. The inner lip 144 has an inner edge 147 which is co-planer with an outer edge 148 of the outer lip 146. The inner lip 144 and the outer lip 146 deform, seal and secure the collector 102 to the top 104 of the tub 80.

Referring to FIG. 5 the outlet 138 of the collector 102 has a circular outside diameter 150.

Again referring to FIG. 1, a hose 152 is connected to the outside diameter 150 of the outlet 138 of the collector 102. A filter 162 is connected to the hose 152. Tubing 164 is connected to the filter 162. The tubing 164 extends through the side wall 26 of the storage tank 20 at a second opening 165. A second seal 166 using welding or some other means is used to provide a water tight seal at the second opening 165. The tubing 164 is connected to a suction pump means such as a vacuum pump 167.

The pump 167 has an inlet line 168 which extends downwardly into the storage tank 22 to a point near the bottom 24 of the tank 22.

A first switch 170 has a 110 volt inlet hot line 171 and a first 110 volt outline line 172 which is electrically connected to a first terminal 174 on a value operating means or valve 176. A first 110 volt neutral line 178 is connected to a second terminal 180 on the pump 167. The valve 176 has a sensor such as a first float 182 connected to a second switch 184. A second 110 volt outlet line 186 is electrically connected to the pump 167 at a third terminal 187. A reserve water supply means 188 such as standard household plumbing is connected to the storage tank 22 by means of a third opening 190 in the side wall 26 of the storage tank 22 and is sealed by a third seal 192 such as via weldment to prevent leakage of water through the tank 22. A reserve supply valve 194 is connected to the reserve supply means 188 and has a water level sensor such as a second float 196 attached to the reserve supply valve 194. In a preferred embodiment the supply means 188 has an outlet 198 located above the water level of the tank 22.

The collector 102 of FIGS. 3, 4 and 4 may be secured to the top 104 of the floor 82 of the bathtub 80 by means of adhesive 200 as shown in FIGS. 6, 7 and 8.

Referring to FIG. 6, a collector 202 has an opening 220 which is larger than the floor drain 84.

Referring to FIG. 7, the collector 202 has a bottom ring 222 which has an inside diameter 224 and an outside diameter 226. An upstanding vertical wall 230 extends upwardly from the inner diameter 224 of the bottom ring 222 of the collector 202. The vertical wall 230 has an upper edge 232. A tapered cylindrical wall 234 extends between the outside diameter 226 of the bottom ring 222 of the collector 202 to the upper edge 232 of the vertical wall 230 of the collector 202, thereby forming a conduit 236 within the collector 202. An outlet means 240 is connected to the tapered cylindrical wall 234 the collector 202 and has an opening 242 which is in fluid communication with the conduit 236. The collector 202 is firmly secured by adhesive 200 to the top 104 of the floor 82 of the tub 80.

Again referring to FIG. 6, a series of inlet means or elongated slots 244 are located in the tapered wall 234 of the collector 202. The slots 244 are preferably radially elongated and equally spaced around the collector.

Referring to FIG. 8, the outlet 240 of the collector 202 has a circular outside diameter 260.

The outlet 240 may be connected to the hose 152 as shown in FIG. 2.

The circular collectors 102 and 202 as shown in FIGS. 3, 4, and 5 and FIGS. 6, 7 and 8, respectively, serve to act as a dam around the floor drain 84 as shown in FIG. 2 in order that a water level 264 generally at or above the level of the elongated slots 144 and 244 is formed.

When using the bathtub 80 with the collector 102 placed around the drain 84 as shown in FIG. 2 water may remain in the tub after the stopper or plug 90 has been removed from the floor drain 84. Consequently a U-shaped non-circular collector 302 as shown in FIG. 9 is disclosed as an alternative.

Referring to FIG. 9, The collector 302 has a semicircular section 304 and right and left linear sections 306 and 308 extending tangentially from right and left ends 310 and 312, respectively, of the semicircular section 304. The semicircular section 304 has an inside diameter 314 and an outside diameter 316. The linear sections 306 and 308 have right and left inner edges 318 and 320, respectively, and right and left outer edges 322 and 324, respectively.

Referring to FIG. 10, an upstanding wall 326 extends at the semicircular section 304 upwardly from a planer bottom 328 at the inside diameter 314 of the collector 302 to a top edge 332 of the collector 302. A tapered wall 334 extends from the top edge 332 of the upstanding wall 326 to the bottom 328 of the collector 302 at the outside diameter 316 thereby forming a passageway 336.

Referring to FIG. 11, the upstanding depending wall 326 also extends from the bottom 328 of the collector 302 at the right and left inner edges 318 and 320 of the right and left linear sections 306 and 308 (FIG. 9), respectively, upwardly to the top edge 332 of the collector 302. The tapered wall 334 extends from the top edge 332, downwardly and inwardly toward the right and left outer edges 322 and 324 (FIG. 9) of the linear sections 306 and 308, respectively, of the collector 302, providing right and left conduits 338 and 340 which connect with passageway 336 to form a collector inlet passage 342.

Referring to FIG. 12, an outlet means in the form of a tubular conduit 344 extends upwardly and outwardly from the tapered wall 334 of the collector 302 and has an opening 346 which has an outside diameter 348.

Again referring to FIG. 10, extending downwardly and inwardly from the bottom 328 of the collector 302 at the inside diameter 314, the right inner edge 318 and the left inner edge 320 of the semicircular section 304, the right linear section 306 and the left linear section 308, respectively, is an inner lip 360. An outer lip 366 extends downwardly and outwardly from the bottom 328, at the outside diameter 316, the right outer edge 322 and the left outer edge 324 of the semicircular section 304, the right linear section 306 and the left linear section 308, respectively, and has an outer edge 370 which is co-planar with an inner edge 372 of the inner lip 360.

The collector of FIGS. 9, 10, 11 and 12 may be secured to the top 104 of the floor 82 of the bathtub 80 by means of adhesive 400 as shown in FIGS. 13, 14, 15 and 16.

Referring to FIG. 13, a collector 402 has a semicircular section 404 and right and left linear sections 406 and 408 extending tangentially from right and left ends 410 and 412, respectively, of the semicircular section 404. The semicircular section 404 has an inside diameter 414 and an outside diameter 416. The right and left linear sections 406 and 408 have right and left inner edges 418 and 420, respectively, and right and left outer edges 422 and 424, respectively.

Referring to FIG. 14, an upstanding wall 426 extends at the semicircular section 404 upwardly from a planer bottom 428 at the inside diameter 414 of the collector 402 at a top edge 432 of the collector 402. A tapered wall 434 extends from the top edge 432 of the upstanding wall 426 to the bottom 428 of the collector 402 at the outside diameter 416 thereby forming a passageway 436.

Referring to FIG. 15, the upstanding wall 426 also extends from the bottom 428 of the collector 402 at the right and left inner edges 418 and 420 (FIG. 14) of the right and left linear sections 406 and 408, respectively, upwardly to the top edge 432 of the collector 402. The tapered wall 434 extends from the top edge 432 downwardly and inwardly toward the right and left outer edges 422 and 424 (FIG. 14) of the right and left linear sections 406 and 408, respectively, of the collector 402, providing right and left conduits 438 and 440 which connect the conduit 436 to form a collector inlet passage 442.

Referring to FIG. 16, an outlet means in the form of a tubular conduit 444 extends upwardly and outwardly from the tapered wall 434 of the collector 402 and has an opening 446 which has an outside diameter 448.

When utilizing the recovery system 20 as shown in FIG. 1, the collector 102 or 202 is placed on the top 104 of the floor 82 of the bathtub 80 and water is added to the tub to a position slightly below the overflow pipe 92. The water recovery system 20 is not energized until the bathing is completed. When the bathing is complete, rather than normally removing the stopper or plug 90 from the floor drain 84 to drain the bath water through the drain pipe 86, the first switch 170 is flipped from the off position to the on position. Turning the first switch 170 to the on position permits the flow of electricity through the first 110 volt outlet line 172 to the first terminal 174 where the valve 178 is located. The sensor 182 on the valve 178 senses the condition of the tank 22 being full. If the tank 22 is full, the sensor 182 flips the second switch 184 into an open position stopping the flow of electricity through the second 110 volt outlet line 186 in order that the vacuum pump 167 will not draw water from the bathtub 80 and overfill the tank 22.

If, on the other hand, the tank 22 is not full, the sensor 182 will permit the second switch 184 to close completing the circuit including the hot line 171, the first outlet line 172 and the second outlet line 186 in order to allow the vacuum pump 167 to draw water from the bathtub 80 and fill the tank 22.

The water is then drawn from the collector 102 through the hose 152 to the filter 162. The filter 162 separates particulate contamination from the water that accumulates in the water from the bathing process in order that the plumbing components, in particular the vacuum pump 167, are not damaged or clogged. Water at the filter 162 continues on through the tubing 164, through the vacuum pump 167 and into the tank 22.

If the water in the tank 22 falls below a minimum level 500 the second float 196 is lowered to a point that opens the reserve supply valve 194 which permits water to flow through the reserve water supply means 188 and into the tank 22 at the outlet 198.

The flushing of the tank-type toilet 36 is accomplished by normal means as in the standard household tank-type toilet 36 by having the water in the toilet reservoir 76 quickly emptied creating a flushing action to the toilet 36.

In order to refill the toilet reservoir 76 the toilet valve 72 opens permitting water to flow from the first pipe 40 located near the bottom 24 of the storage tank 22 through the "T" 46, the tubing 66 and the toilet reservoir fitting 70 to the toilet valve 72 which remains in the open position until the toilet reservoir 76 is filled. Once the toilet reservoir 76 is filled, the toilet valve 72 shuts stopping the flow of water from the storage tank 22 to the toilet reservoir 76.

The use of the collector 102 that may be placed on the top 104 of the floor 82 of the bathtub 80 by either of two simple means, adhesion or suction, providing for a simple and easy retrofit which does not require the removal of the bathtub 80 from the bathroom 30 nor access to the drainpipe 86 beneath the bathtub 80.

By locating the tank 22 within the same bathroom 30 which has the tank-type toilet 36 and the bathtub 80, all plumbing connections and electrical connections can be performed within the same room and, if all electrical wiring and plumbing are located external to the walls, the entire installation can be completed without any disturbance to the dry wall or any other structures within the room.

The use of the valve 176 having the sensor 182 which operates the second switch 184 to deenergize the vacuum pump 167 when the tank 22 is full avoids over filling and overflowing of the tank 22 when the use of water for the bathtub 80 greatly exceeds the use of water for the tank-type toilet 36.

Referring to FIG. 2, the bather first turns the first switch 170 as shown in FIG. 1 on to energize the vacuum pump 167 and then begins to shower. The collector 102 or 202 is placed centrally over the floor drain 84 so that the center opening 120 is over the floor drain 84. The bather then turns the showerhead 110 on and water begins to collect in the bathtub 80 until the water level 264 reaches the point where the water enters the collector 102 through the elongated slots 142 as shown in FIG. 3. The water then exits the collector 102 through the opening 140, enters the hose 152 and progresses as earlier described into the tank 22. If the vacuum pump 167 cannot draw water through the collector 102 or 202 with sufficient flow rate to equal that of water leaving the showerhead 110, water spills over the upper edge 132 of the collector 102 and cascades into the center opening 120 and down the floor drain 84.

When the showering has ended a certain amount of water from the bathtub 80, i.e. to the water level 264 will remain in the bathtub 80 unless the collector 102 is then removed from the bathtub 80 in order that the water can flow down the floor drain 84.

If removal of the collector 102 is impractical, an alternative is to utilize the collector 302 or 402 which has a U-shaped configuration which permits drainage of the water level of the bathtub 80 when the showering is complete.

The use of the doughnut shaped connector 102 or 202 when used with the bathtub 80 having the showerhead 110, permits the flow of water in the bottom of the bathtub 80 to cascade over the upper edge 132 of the collector 102 to avoid an excessively high water level in the bathtub 80 during the showering.

The use of the U-shaped collected 302 or 402 or the placement of the collector 102 or 202 in an area other than near the floor drain 84, prevents the accumulation of water in the bathtub 80 when the bathing is over.

The presence of the filter 162 in the plumbing between the collector 102 and the vacuum pump 167 prevents damage to the vacuum pump 167 and the valves 72 and 178 from contamination in the gray water.

The use of the reserve supply means 188 connected with the second float 196 and the reserve supply valve 194 with an outlet 198 in the tank 22 provides for reserve water supply in the event that the use of the water for the tank-type toilet 36 greatly exceeds the use of water for bathing.

The use of the recovery system 20 of the present invention permits for the incremental installation of a water recovery system in the single bathroom 30, in order that investment costs for a conversion to recovery systems can be extended over a longer period of time.

The use of the removable collector 102 and external wiring and plumbing, as well as the tank 22 located within the bathroom 30 minimizes the cost of the installation by minimizing the quantity of plumbing and wiring required, minimizing the cost of the installation of the wiring and the plumbing and eliminating the need for any plaster, dry wall or other structural work.

Still other aspects, objects, and advantages of the present invention can be obtained from a study of the specification, the drawings and the appended claims.

I claim:

1. A waste water recovery system for recycling water used for bathing in a shower/bath device having a floor with a drain opening therein, said water to be subsequently used with a tank type toilet, said system comprising in combination:

a storage tank including suction pump means for drawing shower/bath water into the storage tank;

valve operated means for timely operation of the pump means when water in the storage tank is below a first level and shutting off of the pump means when the water is above the first level;

supply means for directing water from the storage tank to said toilet tank;

means for collecting said shower/bath water, said means being adapted to be attached to a top surface of the floor, said means including a central opening such that said means surrounds and is spaced apart from the floor drain opening, said means having a inlet for shower/bath water and an outlet for outletting said shower/bath water to a means for directing said shower/bath water via the suction pump means for pumping shower/bath water to the storage tank;

whereby said central opening will allow access of said, shower/bath water, which flows over said means for collecting, to flow into said drain opening.

2. A waste water recovery system as claimed in claim 1 wherein said collector means is adhesively fixable to the floor.

3. A waste water recovery system according to claim 1 including:

a reserve supply means for replenishing water in said storage tank in absence of a sufficient water supply.

4. A waste water recovery system as claimed in claim 1 wherein said collector means is circularly surrounding and spaced apart from the floor drain.

5. The improved collection device of claim 1, wherein said means for collecting is circular and includes a central opening which is larger than the floor drain.

6. A waste water recovery system as claimed in claim 1 wherein said storage tank has reserve supply means to maintain the level in the storage tank above a predefined minimum level.

7. The waste water recovery system of claim 6 wherein the reserve supply means is a valve operated means attached to a fresh water line whereby fresh water is added to the storage tank when the water level in the tank is below a second level.

8. A waste water recovery system as claimed in claim 1 wherein the suction pump means is operable by a switch.

9. A waste water recovery system as claimed in claim 1 wherein the switch is activated by the presence of water in the collection means.

10. The improved collection device of claim 1, wherein said means for collecting includes a planar bottom surface, a vertically extending surface, and wherein the external surface is a tapered surface extending between the bottom surface and the vertically extending surface.

* * * * *